June 13, 1950     A. DE LA MATER     2,511,331
AUTOMOBILE CIGARETTE LIGHTER
Filed June 28, 1948
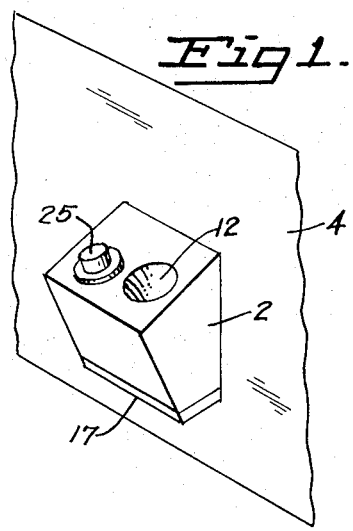
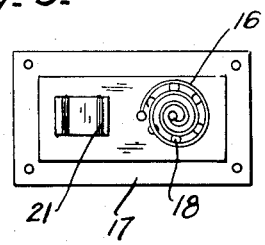
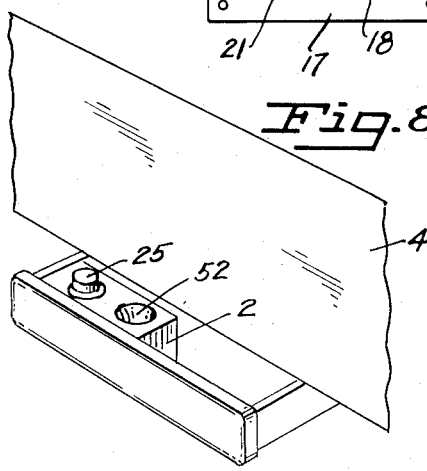
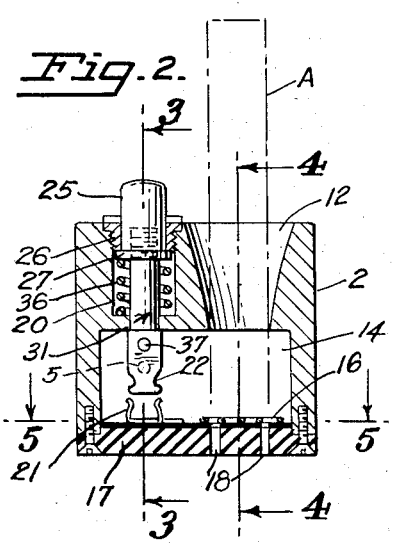
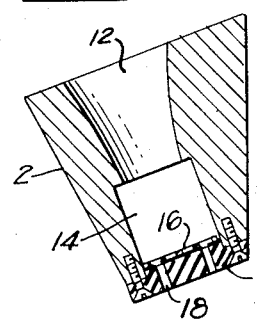
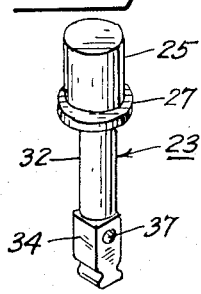
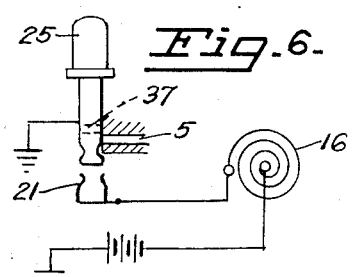
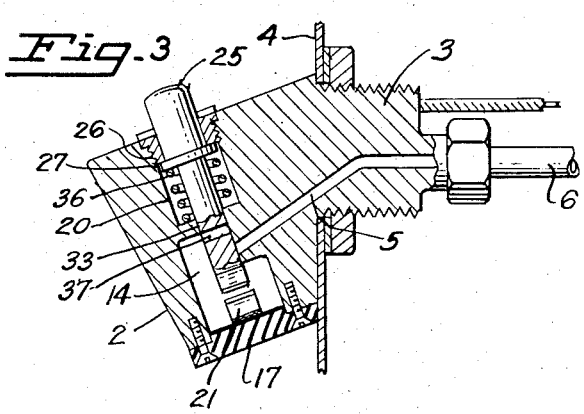
INVENTOR.
ANDREW DE LAMATER
BY
Stephen J. Townsend
ATTORNEY Patented June 13, 1950

2,511,331

UNITED STATES PATENT OFFICE 2,511,331

AUTOMOBILE CIGARETTE LIGHTER

Andrew De La Mater, San Francisco, Calif.

Application June 28, 1948, Serial No. 35,636

3 Claims. (Cl. 219—32)

This invention relates to cigarette lighters and more particularly to a cigarette lighter adapted for use in an automotive vehicle.

It is a principle object of the present invention to provide a lighter adapted particularly for use in automotive vehicles which renders the task of lighting a cigarette safe and sure without distracting the attention of the driver from the road or vehicle controls.

It is recognized that a hazard of driving is the distraction of a driver of an automotive vehicle occasioned upon lighting a cigarette inasmuch as the eyes of the driver are divided between the roadway and steering controls and the means utilized to ignite the cigarette. Similarly, should an occupant of an automotive vehicle endeavor to ignite a cigarette for the driver thereof distraction of the driver from his primary responsibility as the operator of the automotive vehicle is occasioned.

It is another object of the present invention to provide a cigarette lighter for automotive vehicles which is arranged to ignite a cigarette without the necessity of the driver holding the cigarette in his mouth to create a draught to engender ignition thereof.

A further object of the present invention is to provide a cigarette lighter adapted to light a cigarette in a rapid and convenient manner without the necessity of the smoker holding the cigarette during the operation of ignition.

It is a further object of the present invention to provide a cigarette lighter especially useful in automotive vehicles, which is arranged to hold a cigarette, ignite it and exhaust to atmosphere the smoke caused by said ignition.

It is a further object of the present invention to provide an attractive, simple, sturdy, comparatively inexpensive cigarette lighter for use in automotive vehicles which is safe in operation and eliminates the use of matches or other similar fire hazards.

Another object of this invention is to provide an automatic cigarette lighter which may be installed in varying places and in varying positions within a conventional automotive vehicle compartment.

Another object of this invention is to provide an automatic cigarette lighter wherein air is caused to be forced through the ignited end of a cigarette without employing suction cups or the like which are adapted to fit over and operate upon the end of the cigarette opposite the end being ignited. Suction cups of the type referred to are generally disclosed in the following named patents with which I am familiar:

| Patent No. | Issue Date | Patentee |
|---|---|---|
| 1,373,006 | Mar. 29, 1921 | Jay |
| 1,521,901 | Jan. 6, 1925 | Morrill |
| 1,558,915 | Oct. 27, 1925 | Pengilly |
| 1,608,615 | Nov. 30, 1926 | Pengilly |
| 1,823,609 | Sept. 15, 1931 | Kappenberg |

It is a further object of the present invention to provide a cigarette lighter of the character mentioned which is arranged to be built into the dashboard of an automotive vehicle to receive a cigarette therein in order to ignite the same without manual handling of the cigarette during said ignition operation.

It is a further object to provide a cigarette lighter operable to ignite automatically a cigarette upon actuation of a switch.

Further objects of the present invention will become apparent upon referring to the accompanying specification and drawings in which similar characters of reference represent corresponding parts in the several figures of the drawings.

Referring to the drawings:

Fig. 1 is a perspective view of the present invention.

Fig. 2 is a transverse sectional view of the cigarette lighter and showing a cigarette disposed therein in broken lines.

Fig. 3 is a sectional view taken on line 3—3 of Fig. 2.

Fig. 4 is a sectional view taken on line 4—4 of Fig. 2.

Fig. 5 is a sectional view taken on line 5—5 of Fig. 2.

Fig. 6 is a wiring diagram of the present invention and showing the push button control in operative position.

Fig. 7 is a perspective view of the push button switch and especially the slidable element thereof.

Fig. 8 is a perspective view of a modification of the present invention.

The device comprises a body member, indicated at 2, formed of metal or the like, provided with an exteriorly threaded shank portion 3. The shank portion 3 is adapted to be screwed into a suitable aperture provided preferably in the dashboard 4 of an automotive vehicle. A bore 5 is provided in the body and shank and is in flow communication with a pipe or conduit 6 which leads to the exhaust manifold or the intake manifold of a vehicle engine (not shown). The bore 5 is to enable the causation of a partial vacuum in the hollow body 2 as and for a purpose hereinafter to be fully set forth.

It is to be understood that if the pipe 6, to which bore 5 is connected, leads to the exhaust manifold the connection between said pipe 6 and the exhaust manifold may operate on a Venturi principle in order to create a partial vacuum in the bore 5 which leads to the hollow interior of member 2. On the other hand, if the pipe 6 is connected to the intake manifold of the vehicle engine a similar suction function will result in said hollow body member 2. It is understood that the pipe 6 may lead to any suction inducing device or mechanism other than the manifolds mentioned.

A cigarette-receiving aperture 12 is provided in the top of body 2 and extends into the chamber or cavity 14 in said body 2. The aperture 12 is preferably beveled outwardly toward the top open end thereof in order that a cigarette may be inserted easily thereinto. The minimum diameter of the aperture 12 is just slightly larger than the standard outside diameter of a conventional cigarette.

Fig. 2 illustrates a cigarette A disposed in operative position in the aperture 12 and shows an end thereof in contact with a heating element, such as an electric coil or electrode 16, which said coil 16 is axially aligned with said aperture 12. The heating coil illustrated in the drawings is air pervious and comprises a spirally wound wire coil formed with air spaces between the turns thereof.

The open bottom end of the body 2 is provided with a floor piece 17, formed of suitable insulating material, and a plurality of apertures 18 is provided in said floor piece 17, beneath said coil 16, to enable entry of air into the chamber 14 for a purpose to be referred to hereinafter.

Any suitable means may be utilized to attach the floor piece 17 to the metal body 2, such as for example, glue, screws, or the like, and the coil or electrode 16 is carried by the floor piece 17 and is therefore insulated from the metal body 2. Electrically and heat conductively attached to and spaced laterally from said coil 16 is a heat responsive switch means formed of heat and electrically conductive material. I prefer to employ a bi-metal switch, such as is illustrated in Figs. 2, 3, 5 and 6 and which comprises a pair of upwardly projected spaced bi-metal ears 21, curved to receive the notched end portion 22 of a push button switch, indicated generally at 23, which is slidably disposed in bore 20 of body 2. The switch members 21 are connected to the coil 16, as aforesaid, and are insulated from the metal body 2. The push button switch 23 which operates in bore 20 comprises a button 25 disposed adjacent to the aperture 12, and which said button projects above the top surface of the body 2 for convenient access thereto.

A bearing 26 is threaded into bore 20 and receives slidably the button member 25, which said button member is provided with a bottom annular flange 27 adapted to abut against the bottom of said bearing 26 to prevent movement of said button upwardly beyond a predetermined limit defined by said bearing 26. A shank member formed of electrically conductive material, indicated generally at 31, is connected to the button and is movable therewith. The shank comprises an upper rounded portion 32 movable slidably in a guide bearing 33 and a bottom squared portion 34. Spaced concentrically of shank portion 32 is a coil spring 36 arranged to bias normally said shank and button upwardly to an inoperative position, as illustrated in Figs. 2 and 3. An aperture 37 is provided through the bottom portion 34 and is arranged to register with bore 5 when the button is depressed to engage the notched end 22 of shank 31 in the switch members 21, thus enabling air communication from chamber 14, through aperture 37 into bore 5 and thence to the exhaust or intake manifold through conduit 6 and connections (not shown). When the button and shank are returned to inoperative position (Fig. 2) the squared portion of shank 31 effectively seals off communication between bore 5 and chamber 14.

The diagrammatic Fig. 6 illustrates the push button and shank in inoperative position and illustrates aperture 37 out of registry with bore 5.

In operation, a cigarette is disposed in aperture 12 and the head thereof rests upon the coil or electrode 16 which is connected by a wire 43 to the automobile battery preferably adjacent to the ignition switch of a conventional automotive vehicle. Inasmuch as the body 2 is formed of metal, it is grounded to the body of the automotive vehicle. It is further noted that the coil 16 is connected to the upstanding bi-metal switch members 21 so that when the push button switch 23 is depressed for engagement with said members 21 the circuit is completed, thereby actuating the coil 16 to cause ignition of the cigarette. When a predetermined temperature has been attained by the coil 16 the bi-metal switch members 21 are actuated and expand to release the notched bottom end of shank 31 which is then returned to inoperative position through the action of the spring 36, thus breaking the electrical circuit.

When the push button switch is depressed to operative position, as aforesaid, the aperture 37 registers with bore 5 and enables air communication between chamber 14 and the exhaust or intake manifold, as the case may be. Air enters through apertures 18 into chamber 14, either through the suction engendered by the opening of bore 5 or because of the natural flow of unheated air toward aperture 37, it being understood that with the push button switch in inoperative position of Fig. 2 there would be no flow of air from aperture 5, but, when depressed to operative position, as aforesaid, the flow of air would occur as hereinabove described. The air entering through apertures 18 carries off from the vehicle compartment and the vicinity of its occupants the smoke and odors, caused by the ignition of the cigarette, to the atmosphere through bore 5. Similarly, some of the air entering through apertures 18 creates a draught around the end of the cigarette being ignited to stimulate and induce ignition thereof.

It is to be understood that the particular connection of the bi-metal switch members 21 to coil 16 is exemplary only inasmuch as one of said members 21 may be rigidly attached to the floor piece 17 while the other member only is attached electrically and heat conductively to the coil 16. Other and modified manners of connection of the bi-metal switch or equivalent switch means and the heating element 16 will no doubt be apparent to those skilled in the art.

Fig. 8 illustrates a modification of the invention wherein the lighter device is illustrated as forming a part of a cigarette ash tray carried by the dashboard of an automotive vehicle. The principal physical difference in the cigarette lighter mechanism shown in the modification of Fig. 8 is that the cigarette-receiving aperture 52 is preferably disposed vertically while the aperture 12 hereinabove described is disposed at an oblique angle.

It is apparent that a cigarette lighter constructed according to the teachings herein related may be installed in a vehicle compartment to operate efficiently with the longitudinal axis of the cigarette-receiving aperture disposed either in a horizontal or vertical plane or at an angle oblique. This latter fact provides an advantage in that the lighter may be installed in any one of a number of accessible places within a vehicle cab or compartment according to a user's taste and fancy; for example, the lighter may be installed in an aperture cut in the dashboard of an automobile in such manner that the cigarette-receiving aperture is disposed nearly vertically, as illustrated in the drawings, or the lighter may be installed beneath the dashboard or in some other accessible part of the vehicle compartment in such manner that the cigarette-receiving aperture is disposed substantially horizontal. In either case the lighter will operate with equal efficiency.

It is to be understood that numerous changes, modifications and alterations in the design, structure and use of the present invention may be practiced by those skilled in the art within the spirit of the invention and scope of the appended claims.

I claim:

1. A cigarette lighting device comprising a body having a hollow portion, a cigarette-receiving aperture in said body, an air pervious electric heating element in said body adapted to contact an end of a cigarette inserted into said aperture, switch means to energize electrically said heating element comprising a heat responsive element arranged to de-energize said heating element after a predetermined heat is attained thereby, and means comprising said switch means to induce a forced draught through said air pervious heating element into said hollow portion of said body when said heating element is energized.

2. A cigarette lighting device comprising a body having a hollow portion, a cigarette-receiving aperture provided in said body and communicating with said hollow portion, an air pervious electrical heating element in said body arranged to contact an end of a cigarette adapted to be inserted into said aperture, switch means to energize electrically said heating element, said switch means comprising a heat responsive element arranged to de-energize said heating element after a predetermined temperature is attained thereby, and means comprising said switch means to induce a forced draught of air through said air pervious heating element into said hollow portion of said body and around the end of said cigarette adapted to be inserted into said aperture during the period that said heating element is energized.

3. A cigarette lighting device according to claim 2 and wherein means comprising said means to induce said draught is provided to convey smoke from said device to a point relatively remote therefrom.

ANDREW DE LA MATER.

REFERENCES CITED

The following references are of record in the file of this patent:

UNITED STATES PATENTS

| Number | Name | Date |
|---|---|---|
| 1,520,367 | Pengilly | Dec. 23, 1924 |
| 1,983,738 | Davis | Dec. 11, 1934 |
| 1,984,070 | La Vercombe | Dec. 11, 1934 |
| 1,609,042 | Trapet | Nov. 30, 1936 |
| 2,226,250 | Mayer | Dec. 24, 1940 |
| 2,442,693 | Jackson | June 1, 1948 |